June 12, 1934.   G. EGLOFF   1,962,182
TREATMENT OF HYDROCARBON OILS
Filed Sept. 24, 1931
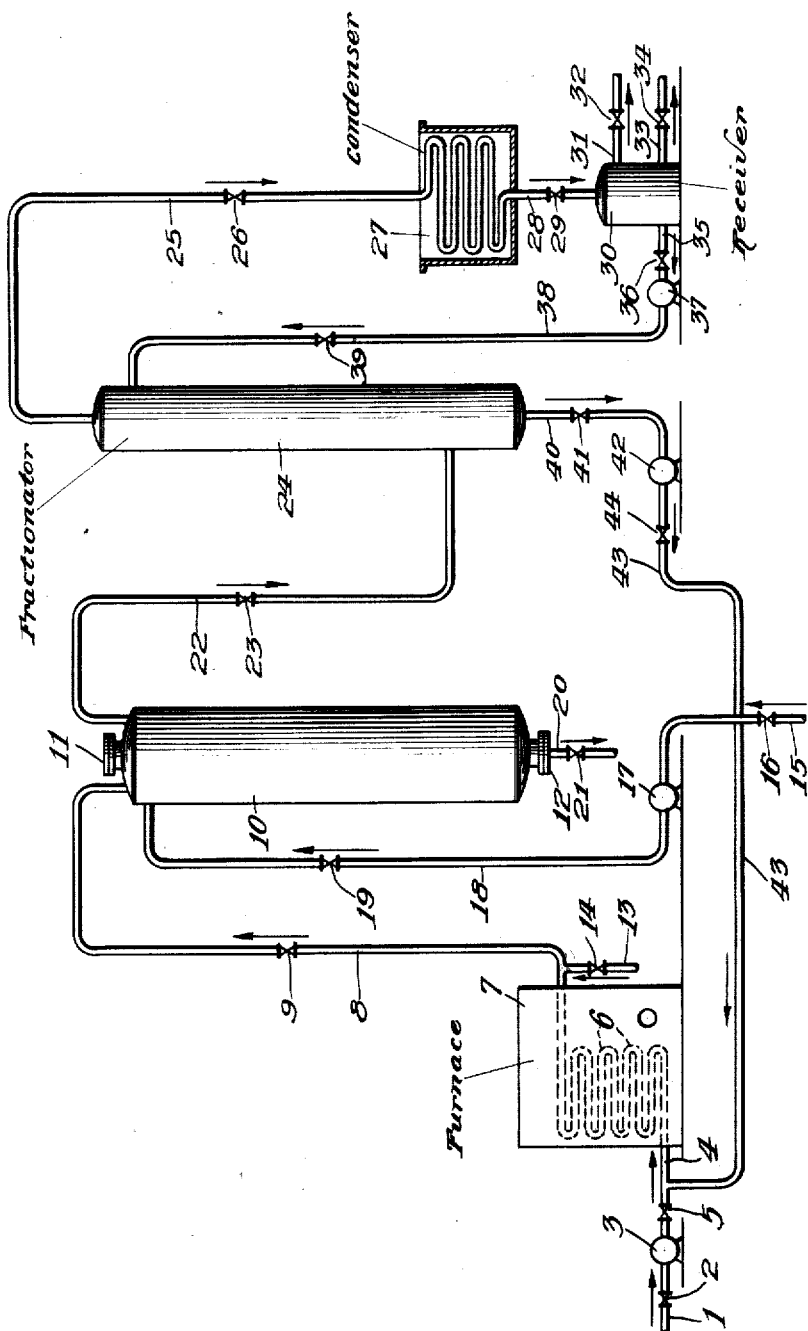
Witness:
Stephen T. Belson
Inventor:
Gustav Egloff,
By Frank L. Belknap
Atty.

Patented June 12, 1934

1,962,182

UNITED STATES PATENT OFFICE 1,962,182

TREATMENT OF HYDROCARBON OILS

Gustav Egloff, Chicago, Ill., assignor to Universal Oil Products Company, Chicago, Ill., a corporation of South Dakota Application September 24, 1931, Serial No. 564,958

5 Claims. (Cl. 196—36)

This invention relates to the treatment of hydrocarbon oils and refers more particularly to the treatment of cracked hydrocarbon distillates though similar straight run distillates may be treated when their composition is such that the treatment is warranted.

More specifically, the invention has reference to an improved mode of treating the lower boiling products of cracking operations containing major percentages of gasoline boiling range hydrocarbons, such distillates being commonly known as "pressure distillates." The process of the invention provides a method of rendering gasolines produced from these distillates of a character suitable for use as motor fuel, the details of operation and the examples of the results of the process being described in detail hereinafter.

Pressure distillates, particularly those resulting from the intensive cracking of the heavier and less valuable portions of petroleums under conditions severe enough to produce substantially maximum yields of motor fuel boiling fractions, are characterized by the presence of much larger amounts of unsaturated and aromatic hydrocarbons than are found in corresponding boiling range distillates produced in the primary distillation of the crudes. In addition when the heavy oils cracked contain sulphur in appreciable quantities there is frequently a concentration of the sulphur in the gasoline-containing distillates, analysis having shown the presence of mercaptans, thio-ethers, alkyl mono and poly sulphides and thiophene compounds as well as dissolved hydrogen sulphide. The more highly unsaturated members of the first named class of compounds, that is, the unsaturated hydrocarbons, are generally objectionable on account of their tendency to polymerize and form gummy and resinous products which cause difficulty in the clogging of feed lines and sticking of valves, etc., in automobile engines. The second class of compounds, that is, the sulphur compounds, may be divided in general into hydrogen sulphide and its mono substitution products, the mercaptans, which have a foul odor and a marked corrosion effect upon metals and the di-substitution products of hydrogen sulphide such as sulphur ethers and the heterocyclic compounds resembling thiophene which produce oxides of sulphur on combustion and may generate sufficient amounts of sulphur acids to cause crank case corrosion if certain precautionary measures are not taken such as proper ventilation. The manufacturer of gasoline, therefore, is confronted with the problem of reducing the content of highly unsaturated hydrocarbons and the more reactive sulphur compounds in his product and the present invention discloses an improved process for controllably effecting these ends.

In one specific embodiment, the invention comprises heating and evaporating cracked hydrocarbon distillates under superatmospheric pressure, passing the vapors into a reaction zone, separately injecting into the reaction zone at proper points controlled proportions of steam and a metal of the alkali or alkaline earth group to produce nascent or activated hydrogen, providing time for the completion of desired reactions, removing alkaline or oxidized metallic reaction products, fractionating the vapor mixture to produce gasoline vapors of desired boiling point range which are cooled, condensed and collected and intermediate refluxes which are returned to the reaction zone for further treatment.

In a preferred embodiment of the invention the metal employed to react with steam and produce hydrogen necessary for the treatment of pressure distillate vapors is preferably one which can be used as a liquid and injected in a finely divided condition into the mixture of oil vapors and steam in the reaction zone. Such metals will generally be those of the alkaline series including, for example, sodium. potassium and lithium whose melting points are respectively 208° F., 144° F., and 367° F. Under the preferred conditions of operation which will be presently described, the hydroxides of these metals which are produced incidental to the treating reactions are removed as liquids.

An operation characteristic of the process may be conveniently described with reference to the attached drawing which shows in essential detail an arrangement of elements by which the process may be carried out. The figures used are more or less conventional and the drawing is diagrammatic for the purpose of bringing out the main features of the operation and not confusing the description by excessive detail.

Referring to the drawing, cracked distillates may be admitted to the process from a source not shown through a line 1 containing a control valve 2 to a feed pump 3. In case vapors are introduced directly from a cracking plant, pump 3 may be suitably varied in construction to enable their proper handling. In either event, the vapors or liquids discharged by pump 3 pass through a line 4 containing a control valve 5 into and through a heating element 6 disposed to receive heat from a furnace 7. Intermediate insufficiently converted fractions from the process may be introduced into line 4 from a return line 43 as will be described at a later point.

During passage of the hydrocarbon materials through the heating element they are brought to a temperature best suited to the subsequent treating reaction, and since this temperature will necessarily vary with the type of stock treated and the extent of the treatment desired as well as the degree of heat liberated by the interaction of the metals and steam it is no possible to state any narrow range between the limits of which good treatments may always be expected. In general, however, the temperatures may be comprised between 500° F., and 900° F. The pressures employed are preferably highly superatmospheric and while pressures as high as 5000 pounds per square inch may be used, such excessive pressures are not generally necessitated but commonly more moderate pressures of 1000 to 2000 pounds per square inch. These pressures are preferably maintained throughout the reaction zone to insure proper concentration of the hydrogen necessary for the treating reactions involved.

It may be found convenient to add saturated or superheated steam to the oil vapors during their passage through a line 8 containing a control valve 9 and leading to reaction chamber 10, and line 13 containing control valve 14 may be provided for this introduction, the means for generating the high pressure steam not being shown.

The molten, hydrogen-generating metal such as, for example, sodium may be conducted to a pump 17 through a line 15 containing a control valve 16 and discharged through a line 18 containing a control valve 19 into the reaction chamber at a point near the top as indicated. By the use of suitable distributing devices such as nozzles, sprays or atomizing devices, the molten sodium may be introduced into the chamber in such a state of subdivision that an immediate and rapid generation of extremely active or nascent hydrogen is produced. By suitably regulating proportions of steam and sodium according to the chemical equation characterizing their reaction, substantially no excess of either of the reacting constituents need be formed. There is therefore produced active hydrogen in sufficient excess to insure hydrogenation of unsaturated constituents of the vapors and the removal of the major portion of the sulphur as hydrogen sulphide. There will probably be some direct reaction of the sodium upon the sulphur compounds with the formation of sodium sulphide.

There will be produced incidentally to the main reaction of vapor treatment corresponding amounts of alkali hydroxide which will accumulate as a liquid in the reaction zone and be removed therefrom through a bottom draw line 20 containing control valve 21, to be available for any of the many uses which these compounds have in the chemical industry. The reaction chamber may have upper and lower removable manheads 11 and 12 respectively to permit entry at intervals for cleaning and inspection. At such times any amounts of caustic material which may adhere to the side walls of the chamber may be removed by the simple expedient of water washing.

It is recognized that the interaction of such highly electro-positive metals as sodium, potassium, etc., with steam generates large amounts of heat but this fact is utilized effectively in producing the proper elevation of temperature required for the hydrogenating and desulphurizing reactions, and by proper choice of mechanical devices and regulation of flow of no special difficulties need be encountered.

Treated vapors containing possibly some excess of hydrogen and some sulphurous gases may be conducted from the reaction chamber and passed through a vapor line 22 and a control valve 23 therein into fractionating equipment typified by fractionator 24. To reduce the cost of equipment it is preferable at this point to reduce the pressure upon the products of the treatment so that only moderately superatmospheric pressures, say, from 50 to 100 pounds per square inch are employed in the fractionating system. Treated gasoline vapors plus fixed gases pass through a line 25 containing a control valve 26 and are condensed during passage through a condenser coil 27, the liquefied portions of the entering mixture and the fixed gases passing through a lie 28 containing control valve 29 to receiver 30. This receiver may have a gas release line 31 containing a control valve 32 to permit the controlled release of fixed gases and a draw line 33 containing a control valve 34 for the removal of gasoline which may then be subjected to neutralizing, sweetening and stabilizing operations as required for the production of a finished motor fuel.

To assist in controlling the boiling point range of the gasoline vapors a certain portion of the end product liquid may be returned to the top of the final fractionator by a recirculating pump 37 which draws these portions from the receiver through a line 35 containing control valve 36 and discharges them through a line 38 containing control valve 39 to the top of the tower.

The heavier and less desirable portions of the products entering fractionator 24, which accumulate in the bottom thereof, may be removed through a line 40 containing control valve 41 and returned to be further subjected to treatment by pump 42 which discharges through a line 43 containing a control valve 44 into line 4 at the head of the heating element as already mentioned.

The improvements and advantages comprised within the invention will be quite obvious from the preceding descriptive material but an example will further emphasize the value of the process. A raw pressure distillate produced in the cracking of California residuum may have prior to treatment by the process of the invention the following properties:

Gravity A. P. I. _____ 51
Per cent of 410° F. end point _____ 80
Per cent total sulphur _____ 0.5

The gasoline distillable from this distillate without special treatment other than a light caustic wash may have the following general properties:

Gravity A. P. I. _____ 53.5
End point _____ 410° F.
Per cent total sulphur _____ 0.4
Color _____ yellow
Gums by copper dish _____ 396

The above pressure distillate may be processed at a pressure of approximately 3000 pounds per square inch and a temperature of 800° F. at the exit of the heating element. Steam may be added between the heating element and the reaction chamber in amounts to approximately 12 pounds per barrel of finished gasoline and 12½ pounds of sodium per barrel may be injected to react with the steam and furnish approximately 5% by weight of hydrogen based on the pressure distillate. There may be produced by the ensuing reactions 27 pounds of caustic soda per barrel of pressure distillate and with suitable fractionation of the treated vapors there may be produced an amount of gasoline equal to 90% of the pressure distillate and having the following properties:

| | |
|---|---|
| Gravity A. P. I. | 56 |
| End point | 410° F. |
| Per cent total sulphur | 0.05 |
| Color, Saybolt | +30 |
| Color after 4 hours' exposure to sunlight | 27 |
| Gums by copper dish, mg/100 cc. | 10 |

The foregoing specification has disclosed the salient features of the process of the present invention and the example cited has shown its commercial applicability. While the descriptive material is in itself accurate the scope of the invention is not to be confined thereto as many other types of operation might be described without departing therefrom, each producing results of substantially equal value to those given in the example.

I claim as my invention:

1. In the desulfurization of cracked gasoline containing sulphur compounds and highly saturated gum-forming hydrocarbons, the improvement which comprises subjecting said distillate in heated vaporous condition to the action of steam in the presence of a metal capable of reacting with steam to form hydrogen and having a melting point below 500° F. while maintaining said distillate at a pressure in excess of 500 pounds per square inch and under a temperature in excess of 500° F.

2. In the desulfurization of cracked gasoline containing sulphur compounds and highly saturated gum-forming hydrocarbons, the improvement which comprises subjecting said distillate in heated vaporous condition to the action of steam in the presence of an alkali metal which melts below 500° F. while maintaining said distillate at a pressure in excess of 500 pounds per square inch and under a temperature in excess of 500° F.

3. In the desulfurization of cracked gasoline containing sulphur compounds and highly saturated gum-forming hydrocarbons, the improvement which comprises subjecting said distillate in heated vaporous condition to the action of steam in the presence of an alkalin earth metal while maintaining said distillate at a pressure in excess of 500 pounds per square inch and under a temperature in excess of 500° F.

4. In the desulfurization of cracked gasoline containing sulphur compounds and highly unsaturated gum-forming hydrocarbons, the improvement which comprises subjecting said distillate in heated vaporous condition to the action of steam in the presence of a metal capable of reacting with steam to form hydrogen while maintaining said distillate at a pressure in excess of 500 pounds per square inch and under a temperature in excess of 500° F., said metal having a melting point below 500° F. whereby it is in liquid condition during the treatment.

5. In the refining of cracked hydrocarbon distillates, the step which comprises subjecting the distillate in vapor form and at a temperature of at least 500° F. to the action of steam and a metal capable of reacting with the steam to form hydrogen and having a melting point below 500° F. whereby the metal is in molten condition during the treatment.

GUSTAV EGLOFF.

CERTIFICATE OF CORRECTION.

Patent No. 1,962,182.    June 12, 1934.

GUSTAV EGLOFF.

It is hereby certified that error appears in the printed specification of the above numbered patent requiring correction as follows: Page 3, lines 26, 37 and 84, claims 1, 2 and 3, respectively, for the syllable "sat-" read unsat-; and that the said Letters Patent should be read with these corrections therein that the same may conform to the record of the case in the Patent Office.

Signed and sealed this 25th day of September, A. D. 1934.

Leslie Frazer (Seal)    Acting Commissioner of Patents.

ate. There may be produced by the ensuing reactions 27 pounds of caustic soda per barrel of pressure distillate and with suitable fractionation of the treated vapors there may be produced an amount of gasoline equal to 90% of the pressure distillate and having the following properties:

| | |
|---|---|
| Gravity A. P. I. | 56 |
| End point | 410° F. |
| Per cent total sulphur | 0.05 |
| Color, Saybolt | +30 |
| Color after 4 hours' exposure to sunlight | 27 |
| Gums by copper dish, mg/100 cc. | 10 |

The foregoing specification has disclosed the salient features of the process of the present invention and the example cited has shown its commercial applicability. While the descriptive material is in itself accurate the scope of the invention is not to be confined thereto as many other types of operation might be described without departing therefrom, each producing results of substantially equal value to those given in the example.

I claim as my invention:

1. In the desulfurization of cracked gasoline containing sulphur compounds and highly saturated gum-forming hydrocarbons, the improvement which comprises subjecting said distillate in heated vaporous condition to the action of steam in the presence of a metal capable of reacting with steam to form hydrogen and having a melting point below 500° F. while maintaining said distillate at a pressure in excess of 500 pounds per square inch and under a temperature in excess of 500° F.

2. In the desulfurization of cracked gasoline containing sulphur compounds and highly saturated gum-forming hydrocarbons, the improvement which comprises subjecting said distillate in heated vaporous condition to the action of steam in the presence of an alkali metal which melts below 500° F. while maintaining said distillate at a pressure in excess of 500 pounds per square inch and under a temperature in excess of 500° F.

3. In the desulfurization of cracked gasoline containing sulphur compounds and highly saturated gum-forming hydrocarbons, the improvement which comprises subjecting said distillate in heated vaporous condition to the action of steam in the presence of an alkalin earth metal while maintaining said distillate at a pressure in excess of 500 pounds per square inch and under a temperature in excess of 500° F.

4. In the desulfurization of cracked gasoline containing sulphur compounds and highly unsaturated gum-forming hydrocarbons, the improvement which comprises subjecting said distillate in heated vaporous condition to the action of steam in the presence of a metal capable of reacting with steam to form hydrogen while maintaining said distillate at a pressure in excess of 500 pounds per square inch and under a temperature in excess of 500° F., said metal having a melting point below 500° F. whereby it is in liquid condition during the treatment.

5. In the refining of cracked hydrocarbon distillates, the step which comprises subjecting the distillate in vapor form and at a temperature of at least 500° F. to the action of steam and a metal capable of reacting with the steam to form hydrogen and having a melting point below 500° F. whereby the metal is in molten condition during the treatment.

GUSTAV EGLOFF.

CERTIFICATE OF CORRECTION.

Patent No. 1,962,182.   June 12, 1934.

GUSTAV EGLOFF.

It is hereby certified that error appears in the printed specification of the above numbered patent requiring correction as follows: Page 3, lines 26, 37 and 84, claims 1, 2 and 3, respectively, for the syllable "sat-" read unsat-; and that the said Letters Patent should be read with these corrections therein that the same may conform to the record of the case in the Patent Office.

Signed and sealed this 25th day of September, A. D. 1934.

Leslie Frazer

Acting Commissioner of Patents.

(Seal)